United States Patent Office 3,701,801
Patented Oct. 31, 1972

3,701,801
ALKYL ESTERS OF 4-CHLORO-
ALKYLRESORCYLIC ACID
James Douglas Grossman, Old Bridge, and Kenneth K.
Light, Freehold, N.J., assignors to International Flavors
and Fragrances Inc.
No Drawing. Filed Feb. 8, 1971, Ser. No. 113,699
Int. Cl. C07c 69/78
U.S. Cl. 260—473 S         3 Claims

ABSTRACT OF THE DISCLOSURE

A process is described for the preparation of alkyl 3-chloro ring-substituted resorcylic acid esters which comprises reacting at temperatures of from −20 up to +50° C. an alkyl ring-substituted dihydroresorcylic acid ester with an oxidative chlorine source. Certain novel alkyl 3-chloro ring-substituted resorcylic acid esters which give to fragrances natural and distinctly oakmoss or mousse-like notes are obtained.

BACKGROUND OF THE INVENTION

Natural oakmoss is commercially important in producing high-grade fragrance compositions. Oakmoss constitutes an important and basic part of the fragrance impression of chypre and lavender. In view of the limited availability of natural oakmoss synthetic substitutes are desirable and have been long sought.

It has been found that certain alkyl ring-substituted resorcylic acid esters simulate and resemble the fragrance impression of oakmoss. While a number of routes for the production of such resorcylic acid esters are available, they are rather tedious, complicated, generally uneconomic and none have been shown to produce alkyl 3-chloro ring-substituted resorcylic acid esters. For instance, one of these methods, as reported by Sonn in Berichte, 62B, 3012–6 (1929), involves utilization of the rather expensive, and difficultly recoverable, palladium catalyst for the aromatization of mono- or dialkyl ring-substituted hydro alkyl resorcylates. Another method shown by Robertson et al. in J. Chem. Soc., pp. 313–20 (1939) involves a multi-step sequence difficult to perform and tedious to carry out.

Still another method disclosed by Neelakantan et al. Indian J. Chem. 2(12), 478–84 shows the chlorination of methyl 6-methylresorcylate to yield methyl 6-methyl-3,5-dichlororesorcylate. However, Neelakantan et al. did not show production of the alkyl 3-chloro ring-substituted resorcylic acid esters with only one chlorine atom substituted at the "3" position on the benzene ring.

In Canadian Pat. 837,131 issued on Mar. 7, 1970 mono- and dialkyl ring-substituted resorcylic acid esters are shown to be produced by reacting the corresponding dihydroresorcylic acid esters with an oxidative chlorine material. No temperature limitations are set forth therein. The dihydroresorcylic acid esters are prepared by treating β-ketoalkanoic acid esters with α,β-unsaturated alkyl alkenoates in the presence of an alkali metal alcoholate. The synthesis as set forth therein is not shown to yield alkyl monochloro ring-substituted resorcylic acid esters.

A process for producing non-aromatized materials having a halogen moiety substituted on the ring is shown by Teitel in German Offenlegenschrift 2,002,815 published July 30, 1970 and involves the production of a hydroresorcylic acid ester having the structure:

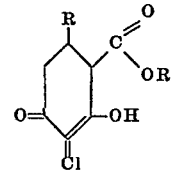

wherin the R groups represent alkyl.

THE INVENTION

The invention is thus related to alkyl 3-chloro ring-substituted resorcylic acid esters, their mode of preparation, and their use as fragrance materials.

The novel 3-chloro ring-substituted resorcylic acid esters of this invention may be represented by the following formula:

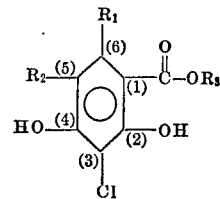

wherein $R_3$ and either $R_1$ or $R_2$ is a lower alkyl radical containing from 1 to 5 carbon atoms, the other of $R_1$ or $R_2$ being hydrogen. Representative of the compounds included within said formula are:

methyl 6-methyl-3-chlororesorcylate
methyl 6-isopropyl-3-chlororesorcylate
methyl 6-ethyl-3-chlororesorcylate
methyl 6-n-butyl-3-chlororesorcylate
methyl 6-n-propyl-3-chlororesorcylate
methyl 6-isobutyl-3-chlororesorcylate
ethyl 6-methyl-3-chlororesorcylate
ethyl 6-isopropyl-3-chlororesorcylate
ethyl 6-ethyl-3-chlororesorcylate
ethyl 6-n-butyl-3-chlororesorcylate
ethyl 6-n-propyl-3-chlororesorcylate
ethyl 6-isobutyl-3-chlororesorcylate
n-propyl 6-methyl-3-chlororesorcylate
n-propyl 6-isopropyl-3-chlororesorcylate
n-propyl 6-ethyl-3-chlororesorcylate
n-propyl 6-n-butyl-3-chlororesorcylate
n-propyl 6-n-propyl-3-chlororesorcylate
n-propyl 6-isobutyl-3-chlororesorcylate
i-butyl 6-methyl-3-chlororesorcylate
i-butyl 6-isopropyl-3-chlororesorcylate
i-butyl 6-ethyl-3-chlororesorcylate
i-butyl 6-n-butyl-3-chlororesorcylate
i-butyl 6-n-propyl-3-chlororesorcylate
i-butyl 6-isobutyl-3-chlororesorcylate
methyl 5-methyl-3-chlororesorcylate
methyl 5-isopropyl-3-chlororesorcylate
methyl 5-ethyl-3-chlororesorcylate
methyl 5-n-butyl-3-chlororesorcylate
methyl 5-n-propyl-3-chlororesorcylate
methyl 5-isobutyl-3-chlororesorcylate
ethyl 5-methyl-3-chlororesorcylate ethyl 5-isopropyl-3-chlororesorcylate
ethyl 5-ethyl-3-chlororesorcylate
ethyl 5-n-butyl-3-chlororesorcylate
ethyl 5-n-propyl-3-chlororesorcylate
ethyl 5-isobutyl-3-chlororesorcylate
n-propyl 5-methyl-3-chlororesorcylate
n-propyl 5-isopropyl-3-chlororesorcylate
n-propyl 5-ethyl-3-chlororesorcylate
n-propyl 5-n-butyl-3-chlororesorcylate
n-propyl 5-n-propyl-3-chlororesorcylate
n-propyl 5-isobutyl-3-chlororesorcylate
i-butyl 5-methyl-3-chlororesorcylate
i-butyl 5-isopropyl-3-chlororesorcylate
i-butyl 5-ethyl-3-chlororesorcylate
i-butyl 5-n-butyl-3-chlororesorcylate
i-butyl 5-n-propyl-3-chlororesorcylate
i-butyl 5-isobutyl-3-chlororesorcylate The resorcylic acid esters of this invention effectively simulate and resemble oakmoss fragrance and are suitable for use by themselves as fragrance materials or in combination with other ingredients in a perfume composition such as a chypre or lavender perfume. The C–1 and C–2 lower alkyl resorcylic esters are preferred as fragrance materials and the methyl esters are most suitable. Particularly preferred is methyl 6-methyl-3-chlororesorcylate by reason of its pronounced and long lasting mousse-like odor.

Also, in accordance with this invention it has been found that monoalkyl 3-chloro ring-substituted resorcylic acid esters thereof, as represented by the formula

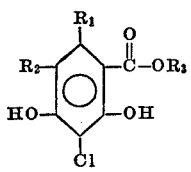

wherein $R_3$ and either of $R_1$ or $R_2$ is a lower alkyl radical containing from 1 to 5 carbon atoms (and the other of $R_1$ or $R_2$ is hydrogen) can be conveniently and more economically prepared by reacting a mono-ring-substituted dihydroresorcylate ester with an oxidative chlorine material. This process has been found to result in high yields of the products desired and suppresses undesirable side reactions.

Suitable mono-ring-substituted dihydroresorcylic acid esters for this reaction may be represented by the following formulae:

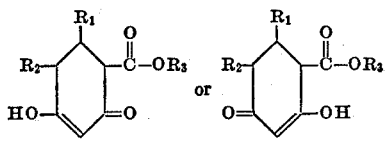

wherein $R_3$ and either of $R_1$ or $R_2$ is a lower alkyl radical containing from 1 to 5 carbon atoms including methyl, ethyl, propyl, butyl, isopropyl and amyl. Mixtures of such isomers can be used. The particular starting material selected will depend upon the end product desired and appropriate choices will be readily apparent. The dihydroresorcylate starting material is preferably substantially pure so as to avoid undesirable side reactions and facilitate isolation and recovery of the end product. Such dihydroresorcylic acid ester starting materials may be prepared by any of the known techniques. For example, such dihydroresorcylic acid esters can be readily made by reacting a beta-keto alkanoic acid ester of the formula

with an $\alpha,\beta$-alkenoate of the formula

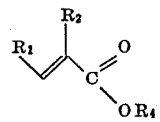

in the presence of an alkali metal alcoholate such as sodium methylate. In the above formulae $R_3$ and $R_4$ are each lower alkyl and either of $R_1$ or $R_2$ is lower alkyl, the other being hydrogen. A further description of the preparation of the intermediate dihydroresorcylic acid esters may be found in Sonn, Berichte, 62B, 3012–6 (1929).

The oxidative chlorine material may be molecular chlorine or any material which, under the conditions of the reaction, yields or is a source of oxidative chlorine such as hypochlorous acid, sulfuryl chloride or nitrosyl chloride. Chlorine is preferred.

The yield obtained when practicing the process of this invention is affected by the degree of contact of the reactants. Thus, if the contact time of the oxidative chlorine material with the hydroresorcylic acid ester is too low, the yields are lower and large amounts of unreacted hydroresorcylic acid ester remains unconverted and must be separated from the reaction mixture. Intermixing of the reactants as by agitation or turbulent mixing will increase the contact time and increase the yield of desired product.

When hypochlorous acid is employed a two phase aqueous- non-aqueous reaction system results where the degree of contact between the two phases is an important if not controlling factor in determining the yield of product. The degree of contact is modified or regulated by nature of the agitation or intermixing.

It is generally desirable to carry out the reaction in an inert solvent vehicle for the hydroresorcylate since at the reaction temperatures required (from —20 to +50° C. or those usually preferred, i.e., from about 10–25° C.) the reactant is in solid form. Such a solvent medium, therefore, is useful to effect adequate contact between the reactants. Suitable inert reaction solvents include non-reactive halogenated hydrocarbons such as chloroform and tetrachloroethane and non-reactive alkanoic acids such as acetic and propionic acids.

The reaction conditions of temperature and pressure are critical and will depend upon a variety of factors including the time of the reaction, the particular reactants used, and the products desired. Generally, it is expedient to run the reaction at atmospheric pressure although elevated pressures may be employed. The reaction must be conducted in the range from about —20 to +50° C. and preferably in the range of from about 10–25° C. The time of reaction is generally determined by the temperature of the reaction and by the absolute pressure above the reaction mass. Other factors such as the nature of the reactants, the extent and duration of contact of the reactants, the mixing system utilized, and the yield and conversions desired may also affect the reaction time. It is usually preferred to carry out the reaction for a period of time from about one to ten hours since shorter periods adversely affect yields while longer periods give no further advantage in the process.

The process is suitably carried out by dissolving or suspending the hydroresorcylic acid ester in an inert organic vehicle such as chloroform or acetic acid whereby a two phase slurry of solid and saturated solution is formed. The oxidative chlorine material, as for example chlorine gas, is introduced into the reaction system, as by bubbling it through the reaction mass, while vigorously agitating the reaction system to achieve intimate intermixing. The organic solvent or vehicle is then removed from the reaction mass, the reactants separated and the reaction product may be recovered and isolated by any conventional techniques such as selective extraction, crystallization or the like.

The monoalkyl-3-chlororesorcylic acid esters obtained by practicing the process of this invention are novel and are useful fragrance materials. In perfume compositions, i.e., a mixture of compounds including, for example, natural oils, synthetic oils, aldehydes, ketones, esters, lactones, alcohols, and frequently hydrocarbons, the resorcylic acid ester thereof contributes its particular olfactory characteristics. The overall effect of the perfume composition can be more than the effect of each ingredient. Thus, the individual resorcylic acid ester may be used to alter the aroma characteristics of a perfume composition, for example, by highlighting or moderating the olfactory contribution of another ingredient of the composition.

Perfume compositions containing the 3-chlororesorcylic acid esters of this invention or the novel materials themselves can be used in conjunction with carriers, vehicles, solvents, dispersants, emulsifiers, surface-active agents, aerosol propellants, fixatives, and the like.

The amounts of the resorcylic acid ester of this invention which will be effective in perfume compositions depends upon several factors, including the other ingredients of the composition, their amounts and the particular effects which are desired. It has been found that perfume compositions containing as little as 0.5% by weight of the compound of the invention, or even less, can be used to impart a basic oakmoss note to such materials as lavender, or chypre for use in soaps, cosmetics, lotions, handkerchief perfumes and similar products. The amount employed will depend on considerations of cost, nature of the end product, the effect desired on the finished product and the particular fragrance sought.

The following examples serve to illustrate embodiments of the invention as it is now preferred to practice it. It will be understood that these examples are illustrative and the invention is to be considered restricted thereto only as indicated in the appended claims.

EXAMPLE I

Methyl 6-methyl-3-chlororesorcylate

Into a slurry of 184 gms. (1 mole) of methyl dihydro-6-methylresorcylate in 500 cc. of glacial acetic acid is bubbled 140 gms. (2 mole) of chlorine gas at a temperature of 15° C. When the addition is complete, the mixture is stirred for ½ hour and then heated to 50° until evolution of the HCl gas ceases. The solution is cooled and poured into water. The precipitate is filtered, washed with water, 5% aqueous sodium bicarbonate solution, and finally with water. The solid is dried in vacuum yielding 146.4 gms. (68%) of methyl 6-methyl-3-chlororesorcylate, M.P. 139–40°; ms, 184, 186, 216 (m), 218 (m+2), 65; NMR, $\beta$, 2.42 (s,3H), 3.79(s,3H), 6.41 (s,3H).

The product is a white crystalline material having a mousse-like odor which can be imparted to soap at a level of 0.25%.

EXAMPLE II

Perfume composition

The following mixture is prepared:

| Ingredients: | Grams |
|---|---|
| Jasmin liquid, A | 15 |
| Rose liquid | 5 |
| Solution orris | 6 |
| Santal oil E.I. | 6 |
| Bergamot | 120 |
| Patchouli oil | 6 |
| Musk ketone, 1/5 in B.B. | 60 |
| Vetivert oil | 5 |
| Methyl 6-methyl-3-chlororesorcylate (produced duced by the process of Example I) [tincture 1/5] | 200 |
| Coumarin | 2 |
| Vanillin | 1.5 |
| Heliotropin | 2 |
| Rose synthetic | 25 |
| Rose otto, Bulgarian | 10 |
| Pimento oil | 5 |
| Olibanum resinoid | 10 |
| Bitter orange oil | 4 |
| Ambrette seed oil | 2 |
| Musk tincture, 3 percent | 250 |
| Alcohol | 4000 |
| | 4734 |

The foregoing perfume formulation is an important part of chypre essence. The methyl 6-methyl-3-chlororesorcylate is used as a replacement for oakmoss. This perfume is incorporated into a handkerchief perfume at the 0.1% by weight level. The methyl 6-methyl-3-chlororesorcylate gives to this fragrance a natural and distinctly oakmoss note.

EXAMPLE III

Methyl 6-methyl-3-chlororesorcylate

Into a 5 liter flask equipped with stirrer, thermometer, condenser, gas inlet tube and bubbler are placed the following materials:

3.5 liters of chloroform
421 grams of methyl 6-methyldihydroresorcylate

Cholrine gas is added while stirring the reaction mass over a period of one hour until the chlorine is no longer taken up and the reaction mass becomes clear. During the bubbling the reaction mass temperature increases from 22° C. up to 37° C. At the end of the reaction, the hydrogen chloride gas ceases to evolve. The solid material is recovered by filtration and weighs 507.1 grams. It is dissolved in 2 liters diethyl ether. The diethyl ether solution is washed using sodium bicarbonate washes until $CO_2$ no longer evolves in the wash solution. The bicarbonate solutions are extracted with ether and the ether layers combined and washed with 10 volumes of sodium hydroxide at 5° C. The methyl 6-methylchlororesorcylate product is recovered by crystallization from the ether layers. 111 grams of dried product is obtained. The structure of the product is shown to be methyl 6-methyl-3-chlororesorcylate by IR, NMR and mass spectral analysis. The product is a white crystalline material having a melting point of 135.8–137.8° C. This material has a mousse-like odor which can be imparted to soap at a level of ¼%.

EXAMPLE IV

Perfume composition

The following mixture is prepared:

| Ingredients | Grams |
|---|---|
| Benzyl acetate | 50 |
| Rosewood | 100 |
| Cedarwood | 150 |
| Linalyl acetate | 100 |
| Ionone | 80 |
| Ethyl cinnamate | 20 |
| Amyl cinnamic aldehyde | 50 |
| Iso-eugenol | 50 |
| Coumarin | 100 |
| Methyl 6-methyl-3-chlororesorcylate (produced by the process of Example III) | 50 |
| Musk xylene | 50 |
| Styrax resin | 100 |

The foregoing perfume formulation is an important part of chypre essence. The methyl 6-methyl-3-chlororesorcylate is used as a replacement for oakmoss. This perfume is incorporated into a soap perfume at the 0.1% level. The methyl 6-methyl-3-chlororesorcylate gives to this fragrance a natural and distinctly oakmoss note.

EXAMPLE V

Ethyl 6-ethyl-3-chlororesorcylate

Into a 5 liter flask equipped with stirrer, thermometer, and condenser gas inlet tube and bubbler are placed the following materials:

3.5 liters of chloroform
405 grams of ethyl 6-ethyldihydroresorcylate

Chlorine gas is added while stirring the reaction mass over a period of one hour until the chlorine is no longer taken up and the reaction mass becomes clear. During the bubbling the reaction mass temperature increases from 22° C. up to 42° C. At the end of the reaction, the hydrogen chloride gas ceases to evolve. The solid material is recovered by filtration and weighs 450 grams. It is dissolved in 2 liters of diethyl ether. The diethyl ether solution is washed using sodium bicarbonate washes until $CO_2$ no longer evolves in the wash solution. The bicarbonate solutions are extracted with ether and the ether layers combined and washed with 10 volumes of sodium hydroxide at 5° C. The ethyl 6-ethyl-3-chlororesorcylate product is recovered by crystallization from the ether layers. 150 grams of dried product is obtained. The structure of the product is shown to be ethyl 6-ethyl-3-chlororesorcylate by IR, NMR and mass spectral analysis. The product is a white crystalline material. This material has a mousse-like odor which can be imparted to soap at a level of ¼%.

EXAMPLE VI

Perfume composition

The following mixture is prepared:

| Ingredient: | Grams |
|---|---|
| Benzyl acetate | 50 |
| Rosewood | 100 |
| Cedarwood | 150 |
| Linalyl acetate | 100 |
| Ionone | 80 |
| Ethyl cinnamate | 20 |
| Amyl cinnamic aldehyde | 50 |
| Iso-eugenol | 50 |
| Coumarin | 100 |
| Ethyl 6-ethyl-3-chlororesorcylate produced by the process of Example V | 50 |
| Musk xylene | 50 |
| Styrax resin | 100 |

The foregoing perfume formulation is an important part of chypre essence. The ethyl 6-ethyl-3-chlororesorcylate is used as a replacement for oakmoss. This perfume is incorporated into a soap perfume at the 0.1% level. The ethyl 6-ethyl-3-chlororesorcylate gives to this fragrance a natural and distinctly oakmoss note.

EXAMPLE VII

Ethyl 6-methyl-3-chlororesorcylate

Into a 5 liter flask equipped with stirrer, thermometer, condenser, gas inlet tube and bubbler are placed the following materials:

750 ccs. of glacial acetic acid
297 grams of ethyl 6-methyldihydroresorcylate

Chlorine gas is added while stirring the reaction mass over a period of one hour until the chlorine is no longer taken up and the reaction mass becomes clear. During the bubbling the reaction mass temperature increases from 17° C. to 22° C. The slurry is then heated to reflux until hydrogen chloride ceases to be evolved. The reaction mass is then added to one liter of water and the solid precipitate is filtered. The product is then crystallized from a 75% solution of acetic acid yielding 111 grams of dried product. The product is shown to be ethyl 6-methyl-3-chlororesorcylate by IR, NMR and mass spectral analysis. The product has melting point of 150 to 151° C. This material has a mousse-like odor which can be imparted to soap at a level of 1%.

EXAMPLE VIII

Perfume composition

The following mixture is prepared:

| Ingredient: | Grams |
|---|---|
| Jasmin liquid, A | 15 |
| Rose liquid | 5 |
| Solution orris | 6 |
| Santal oil E. I. | 6 |
| Bergamot | 126 |
| Musk ketone, ⅓ in B.B. | 60 |
| Vetivert oil | 5 |
| Ethyl 6-methyl-3-chlororesorcylate (produced by the process of Example VII) [tincture ⅓] | 800 |
| Coumarin | 2 |
| Vanillin | 1.5 |
| Heliotropin | 2 |
| Rose synthetic | .25 |
| Rose otto, Bulgarian | 10 |
| Pimento oil | 5 |
| Olibanum resinoid | 10 |
| Bitter orange oil | 4 |
| Ambrette seed oil | 2 |
| Musk tincture, 3 percent | 250 |
| Alcohol | 4000 |
| | 5134 |

The foregoing perfume formulation is an important part of chypre essence. The ethyl 6-methyl-3-chlororesorcylate is used as a replacement for oakmoss. This perfume is incorporated into a handkerchief perfume at the 0.2% by weight level. The ethyl 6-methyl-3-chlororesorcylate gives to this fragrance a natural and distinctly oakmoss note.

EXAMPLE IX

Methyl 6-methyl-3-chlororesorcylate

Into a two-liter flask equipped with stirrer, thermometer, condenser and gas inlet tube are added the following ingredients:

500 ml. propionic acid
92 gms. methyl 6-methyldihydroresorcylate

While maintaining the reaction mass at −15° C., 35 gms. of chlorine gas is added over a period of ½ hour. The reaction mass is then heated to 60° C. and maintained at that temperature for a period of ½ hour. As the reaction mass clears, a precipitate is formed which precipitate is separated by means of filtration. The product of reaction is found to be a mixture of 2 compounds:

(1) Methyl 6-methyl-3-chlororesorcylate; and
(2) 1 - methyl-3,5-dihydroxy-4-chlorobenzene (2-chloroorcinol)

the structures of which are confirmed by NMR, GLC and mass spectral analysis. The materials are separated by means of fractional crystallization.

The desired product has an excellent mousse aroma.

EXAMPLE X

Methyl 5-methyl 3-chlororesorcylate

Into a slurry of 184 gms. (1 mole) of methyl dihydro-5-methylresorcylate in 500 cc. of glacial acetic acid is bubbled 140 gms. (2 moles) of chlorine gas at a temperature of 10° C. When the addition is complete, the mixture is stirred for 40 minutes and then heated to 60° C. until evolution of the HCl gas ceases. The soluItion is cooled and poured into water. The precipitate is filtered, washed with water, 5% aqueous sodium, bicarbonate solution, and finally with water. The solid is dried in vacuum yielding 155 gms. of methyl-3-chloro-5-methylresorcylate, confirmed by IR, NMR and mass spectral analysis.

The product has a mousse-like odor which can be imparted to soap at a level of 1.50%.

EXAMPLE XI

Prefume composition

The following mixture is prepared:

| Ingredient: | Grams |
|---|---|
| Benzyl acetate | 50 |
| Rosewood | 100 |
| Cedarwood | 150 |
| Linalyl acetate | 100 |
| Ionone | 80 |
| Ethyl cinnamate | 20 |
| Amyl cinnamic aldehyde | 50 |
| Iso-eugenol | 50 |
| Coumarin | 100 |
| Methyl 5-methyl-3-chlororesorcylate produced by the process of Example X | 300 |
| Musk xylene | 50 |
| Styrax resin | 100 |

The foregoing perfume formulation is an important part of chypre essence. The methyl 5-methyl-3-chlororesorcylate is used as a replacement for oakmoss. This perfume is incorporated into a soap perfume at the 0.2% level. The methyl 5-methyl-3-chlororesorcylate gives to this fragrance a natural and distinctly oakmoss note.

What is claimed is:

1. A monoalkyl 3-chlororesorcylic acid ester having the formula

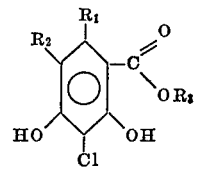

wherein $R_3$ is lower alkyl and either of $R_1$ or $R_2$ is a lower alkyl radical containing from 1 to 5 carbon atoms and the other of $R_1$ or $R_2$ is hydrogen.

2. The compound of claim 1 wherein each of $R_1$ and $R_3$ is methyl, and $R_2$ is hydrogen.

3. The compound of claim 1 wherein $R_1$ is methyl and $R_3$ is ethyl and $R_2$ is hydrogen.

References Cited

FOREIGN PATENTS 738,046 2/1970 Belgium.
837,131 3/1970 Canada.

OTHER REFERENCES

Smith, J., Org. Chem., 25, 588–91 (1960).
Brewster et al., Organic Chemistry, Prentice-Hall Inc., N.J. (1964), p. 605.
Neelakantan et al., Indian J. Chem., 2(12), 478–84 (1964).
Lightowler et al., J. Pharm. Pharmacol., 15(10), 633–8 (1960).

LORRAINE A. WEINBERGER, Primary Examiner

J. F. TERAPANE, Assistant Examiner

U.S. Cl. X.R.

260—468 R; 252—522